United States Patent Office 2,886,522
Patented May 12, 1959

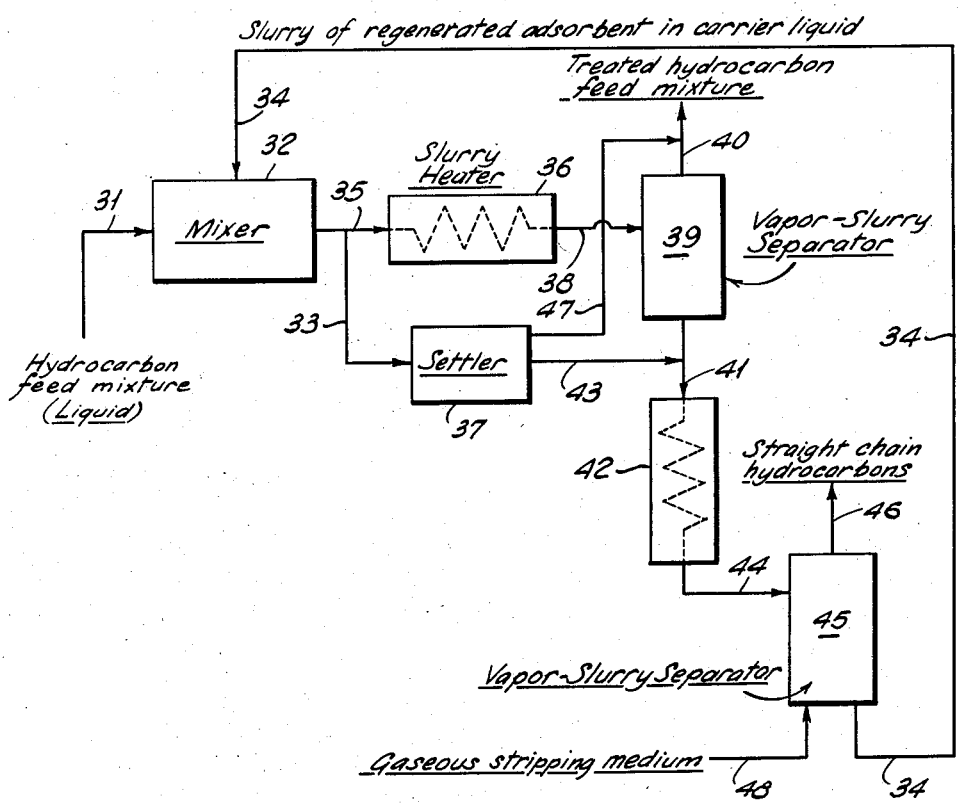

2,886,522
ADSORPTION PROCESS

Thomas A. Cooper, Port Arthur, and Robert A. Woodle, Groves, Tex., assignors to The Texas Company, New York, N.Y., a corporation of Delaware Application July 11, 1955, Serial No. 521,190

6 Claims. (Cl. 208—310)

This invention relates to a method of fractionating mixtures. More particularly, this invention relates to an adsorption separation process employing special adsorbent materials. In accordance with one embodiment this invention relates to an adsorption separation process for fractionating hydrocarbon mixtures, such as hydrocarbon fractions containing straight chain hydrocarbons and non-straight chain hydrocarbons.

Certain materials, solid selective adsorbents, have been proposed to effect a separation of materials based on differences in molecular size or configuration. Solid selective adsorbents which fractionate mixtures according to the molecular size of the components therein have been termed "molecular sieves." For example, Barrer—U.S. 2,306,610 has proposed to effect a separation between straight chain hydrocarbons and non-straight chain hydrocarbons by contacting a mixture containing the same with a special selective adsorbent, a porous crystalline zeolite the crystals of which possess pores of uniform molecular dimension, about 5 Angstrom units, which permit the entry and adsorption of straight chain hydrocarbons, such as normal paraffins and normal olefins, to the substantial exclusion of non-straight chain hydrocarbons, such as isoparaffins, isoolefins, naphthenes and aromatic hydrocarbons.

Certain other solid selective adsorbents, such as certain naturally occurring zeolites and alumino-silicate type molecular sieve adsorbents, have been proposed to effect a selective adsorption of certain components of a mixture in contact therewith. The zeolite or alumino-silicate type molecular sieve adsorbents, however, are relatively fragile solid materials, possessing little structural strength and are readily and easily crushed and reduced to a powder. This lack of structural strength and ability to resist attrition and crushing has militated against employing such solid adsorbents in separation processes wherein the solid adsorbent is moved from one zone to another zone, such as from an adsorption zone to a desorption zone. In fact, in the case of alumino-silicate molecular sieve type of adsorbent the loss of solid adsorbent material which might arise due to attrition and crushing has been prohibitive heretofore with respect to the use of these materials in any treating process other than one employing a fixed bed of such solid adsorbent material.

Accordingly it is an object of this invention to provide an improved selective adsorption separation process for the fractionation of mixtures.

Another object of this invention is to provide an adsorption separation process wherein solid adsorbent material which is normally fragile and easily crushed may be satisfactorily employed.

Still another object of this invention is to provide a special adsorption separation process wherein aluminosilicate molecular sieve type of adsorbents are conveniently and readily moved from one zone such as an adsorption zone to another zone such as a desorption zone.

How these and other objects of this invention are accomplished will become apparent with reference to the accompanying disclosure and drawing which schematically illustrates a selective adsorption process in accordance with this invention suitable for the treatment or fractionation of a liquid feed mixture.

In at least one embodiment of this invention at least one of the foregoing objects will be achieved.

In accordance with this invention a liquid feed mixture to be fractionated is contacted with a solid, particle-form selective adsorbent for one of the components of said mixture, said solid, particle-form adsorbent being admixed as a slurry with an inert carrier liquid. Accordingly, this invention comprises an adsorptive separation process for the fractionation of liquid mixtures wherein the feed mixture, such as a liquid mixture of hydrocarbons, to be fractionated is contacted with a slurry comprising a substantially inert carrier liquid and a solid, particle-form selective adsorbent for one of the components present in said feed mixture.

Although the practice of this invention is particularly applicable to any solid selective adsorbent which possesses relatively little structural strength and ability to resist crushing and attrition or which is ultimately reduced by attrition to a finely divided powder, such as a powder having an average particle size in the range 0.5–5.0 microns, smaller or larger, and accordingly subject to loss in the absence of suitable and/or special adsorbent recovery means, for purposes of simplicity and ease of understanding emphasis will be placed in this disclosure on the applicability of this invention to the molecular sieve type of solid adsorbents, such as alumino-silicate solid adsorbents which selectively adsorb one hydrocarbon type, such as straight chain hydrocarbons, to the substantial exclusion of other hydrocarbon types, such as non-straight chain hydrocarbons. Broadly, however, in the practice of this invention any desired solid, particle-form selective adsorbent may be employed depending upon the component or components to be selectively adsorbed from the feed mixture undergoing treatment. Suitable solid adsorbents which may be employed in the practice of this invention include activated charcoal or carbon, naturally occurring or treated clays, activated alumina, synthetic adsorbent materials, such as silica gels, natural or modified or synthetic zeolites or aluminosilicates and the like.

Certain natural or synthetic zeolites or alumino-silicates, such as a calcium alumino-silicate, exhibit the properties of a molecular sieve adsorbent in that they are made up of porous crystals wherein the pores of the crystals are of molecular dimension and are of substantially uniform size. These materials may be described as water-containing alumino-silicates having the formula $(R,R'_2)O.Al_2O_3.nSiO_2.mH_2O$ wherein R may be an alkaline earth metal such as calcium, strontium or barium or even magnesium and wherein R' is an alkali metal such as sodium or potassium or lithium. Generally the above-described materials, when treated for the removal of substantially all of the water therefrom, retain their crystal structure and are particularly suitable as selective adsorbents for certain types of compounds, such as adsorbents for the selective adsorption of straight chain hydrocarbons to the substantial exclusion of non-straight chain hydrocarbons.

A particularly suitable solid adsorbent for straight chain hydrocarbons, and suitable for use in the practice of this invention, is a calcium alumino-silicate, apparently actually a sodium calcium alumino-silicate, manufactured by Linde Air Products and designated Linde Type 5A Molecular Sieve. The crystals of this particular calcium alumino-silicate have a pore size or opening of about 5

Angstrom units, sufficiently large to admit straight chain hydrocarbons, such as the normal paraffins and the normal olefins, to the substantial exclusion of the non-straight chain hydrocarbons. This particular selective adsorbent is available in various sizes, e.g. in the form of ⅛" or 1/16" diameter pellets or as a finely divided powder having a particle size in the range 0.5–5.0 microns.

Other suitable solid molecular sieve type of adsorbents which may be employed in the practice of this invention include the synthetic or natural zeolites which, when dehydrated, may be described as crystalline zeolites having a rigid three dimensional anionic network and having interstitial dimensions sufficiently large to preferentially adsorb one particular type of hydrocarbons, e.g. straight chain hydrocarbons, to the substantial exclusion of other type of hydrocarbons, e.g. the non-straight chain hydrocarbons. The naturally occurring zeolite, chabazite, exhibits the property of selectively adsorbing straight chain hydrocarbons. Another suitable naturally occurring zeolite, analcite, $NaAlSi_2O_6.H_2O$, when dehydrated or when all or part of the sodium is replaced by an alkaline earth metal, such as calcium, by base exchange, yields a material represented by the formula $(Ca,Na)_2Al_2Si_4O_{12}.2H_2O$ which, after suitable conditioning, will adsorb straight chain hydrocarbons to the substantial exclusion of non-straight chain hydrocarbons. Other naturally occurring synthetically prepared zeolites or alumino-silicates, such as phacolite, gmelinite, harmotome and the like or suitable base exchange modifications of these materials may also be employed as selective adsorbents in the practice of this invention.

Another alumino-silicate molecular sieve type of adsorbent, apparently a sodium faujasite, designated by the trade name Linde Type 13A Molecular Sieve, and possessing an effective pore size of about 13 Angstroms, is a selective adsorbent for aromatic compounds, particularly aromatic hydrocarbons such as the higher molecular weight monocyclic and polycyclic aromatic hydrocarbons.

The selective adsorbent employed in the practice of this invention may initially be of any suitable form or shape, preformed tablets or cylinders, granular, spheroidal or microspheroidal.

In carrying out the practice of this invention a liquid feed mixture, such as a hydrocarbon fraction containing straight chain hydrocarbons and non-straight chain hydrocarbons, is contacted with a slurry containing a solid, particle-form selective adsorbent. The above-indicated contacting operation may take place at any suitable temperature effective to accomplish selective adsorption of one of the components of the feed mixture undergoing treatment. Generally contact between the feed mixture and the adsorbent-containing slurry is effected at a temperature in the range 50–625° F., more or less. The contacting step may be carried out at any suitable pressure, such as a pressure in the range 0–10,000 p.s.i.g., higher or lower, the temperature and pressure being adjusted with respect to the mixture undergoing fractionation so as to maintain the mixture in the desired physical state (liquid phase) during the contacting operation. With respect to a slurry containing alumino-silicate type of molecular sieve adsorbents, it is preferred to carry out the contacting or adsorptive separation step at a temperature in the range 200–500° F. If desired, in the case of viscous liquid feed mixtures there may be added thereto a less viscous inert (non-adsorbed), preferably lower boiling liquid diluent. Advantageously this lower boiling diluent, such as isobutane, or isopentane or similar low boiling liquid is not only a solvent for the feed mixture but also is miscible with the inert carrier liquid.

In the practice of this invention the inert carrier liquid employed to form a slurry containing the solid, particle-form adsorbent material is preferably a high boiling inert liquid, that is, a material which is substantially unadsorbed or unaffected by the selective adsorbent admixed therewith and preferably a liquid which is a selective solvent for the component to be adsorbed from the feed mixture undergoing fractionation. Suitable carrier liquids include a high boiling petroleum fraction, such as a catalytic cycle gas oil, a lubricating or gas oil fraction, a thermal cycle gas oil or other similar high boiling petroleum fractions. Particularly suitable for use in the practice of this invention is diphenyl or diphenyl oxide or mixtures thereof, such as Dowtherm. Other suitable carrier liquids include the well known normally liquid selective solvents for polar organic compounds or for aromatic hydrocarbons such as the phenols, furfural, "Chlorex," as well as the normally liquid organic phosphates, borates and silicate, acyclic acid polymers (Acryloids), olefin polymers, e.g. polyisobutene, polypropylene, etc., alkylated aromatic hydrocarbons, e.g. $C_2$–$C_{20}$ benzenes, etc. It is preferred to employ a carrier liquid which is heat stable, i.e. is not easily thermally decomposed, and which has a boiling point or boiling range substantially greater than the boiling point or boiling point range of the liquid feed mixture undergoing fractionation. Accordingly a carrier liquid having a boiling point in the range 300–900° F., more or less; desirably the boiling point of the carrier liquid is substantially greater, e.g. by about 25–300° F., than the boiling point of the mixture undergoing fractionation.

In accordance with an added feature of this invention it is preferred to employ a normally liquid carrier fluid which is immiscible with the mixture undergoing treatment. Accordingly, when a liquid hydrocarbon mixture is undergoing treatment it is desirable to employ a hydrocarbon immiscible carrier liquid, e.g. furfural. Further, preferably, the carrier liquid preferentially wets the solid adsorbent slurried therewith as compared with the liquid feed mixture undergoing treatment. Also the carrier liquid is desirably more dense than the liquid mixture undergoing treatment but less dense than the adsorbent employed.

After contact has been effected between the liquid mixture to be fractionated and the slurry comprising inert carrier liquid and selective adsorbent, the slurry is recovered from the feed mixture undergoing treatment and subjected or heated to an elevated temperature sufficient to effect desorption of the adsorbed material contained in the selective adsorbent. The desorption operation is carried out at any suitable temperature or pressure effective to desorb the adsorbed material and whereby the resulting desorbed material is in the gaseous or vapor phase. Usually a desorption temperature below or at about the normal boiling point of the carrier liquid is sufficient, such as a desorption temperature in the range 300–900° F., depending upon the boiling point of the materials contained adsorbed in the adsorbent under the conditions of desorption.

Various liquid mixtures may be treated in accordance with the practice of this invention for the separation and recovery of one or more components therefrom. Mixtures which may be treated in accordance with one embodiment of this invention wherein the adsorbent is a selective adsorbent for polar compounds include liquid mixtures containing polar and non-polar compounds or polar and relatively less polar compounds. The practice of this invention is particularly applicable to the separation of liquid mixtures of hydrocarbons, such as mixtures containing $C_4$ and/or $C_5$ and higher hydrocarbons, straight run naphthas, catalytic reformates (platformates) and the like. Other petroleum refinery streams such as hydrocarbon mixtures containing straight chain hydrocarbons and non-straight chain hydrocarbons, or aromatic and non-aromatic hydrocarbons, are also suitable for treatment in accordance with this invention.

Various hydrocarbon mixtures or petroleum fractions which may be advantageously treated include a naphtha or gasoline fraction, such as a light and heavy straight run naphthas, boiling range 50–250° F. and 175–450° F., respectively, a diesel oil fraction, a kerosene fraction, a gas oil fraction and the like. A typical hydrocarbon fraction which may be treated for the removal of selected hydrocarbons or selected fractions therefrom might have a boiling point or boiling range in the range 40–600° F. and higher and, for example, containing a substantial amount of straight chain or aromatic hydrocarbons, e.g. 2–35% by volume and higher. More particularly, a hydrocarbon fraction to be treated might have an initial boiling point in the range 40–300° F. and an end point in the range 150–600° F. and higher. A hydrocarbon fraction to be treated for the removal of straight chain hydrocarbons therefrom might have the following composition:

| Hydrocarbon type: | Percent by volume |
|---|---|
| Naphthenes | 0–75 |
| Aromatics | 0–75 |
| Acyclic saturates and unsaturates (including normal paraffins, isoparaffins, normal olefins and isoolefins | 2–90 |

Referring now to the drawing which schematically illustrates another embodiment of the practice of this invention as applied to the liquid phase fractionation of a hydrocarbon mixture, such as a catalytic reformate or a fraction thereof having a boiling range in the range 150–425° F., the hydrocarbon mixture containing straight chain hydrocarbons and non-straight chain hydrocarbons is introduced via line 31 into a liquid-liquid mixer 32 wherein it is contacted in the liquid phase at a temperature in the range 100–300° F. with a slurry containing solid, particle-form selective adsorbent, such as granular or powder Linde 5A Molecular Sieve, admixed with an inert carrier liquid such as a high boiling inert hydrocarbon fraction, e.g. a thermal or catalytic cycle gas oil having a boiling point in the range 500–750° F., or Dowtherm.

The aforementioned slurry is introduced into mixing zone 32 via conduit 34. The admixture from mixing zone 32 is introduced via conduit 35 into heater 36 wherein the admixture is brought up to a temperature about 100–300° F. higher than the temperature maintained in mixing zone 32, such as a temperature in the range 400–700° F., sufficiently high to vaporize substantially all of the unadsorbed feed hydrocarbon mixture present in the admixture. The resulting heated admixture is removed from heater 36 via line 38 and introduced into vapor-slurry separator 39 from which the unadsorbed portion of the hydrocarbon feed mixture is recovered as a vapor phase via line 40. There is removed from the lower portion of separator 39 a slurry containing substantially only the relatively high boiling carrier liquid together with the solid, particle-form selective adsorbent containing straight chain hydrocarbons adsorbed therein. This slurry is introduced via conduit 41 to heater 42 wherein it is brought to a temperature, such as a temperature at least about 100° F. higher than the temperature of the heated admixture introduced into vapor-slurry separator 39, but preferably below or at about the boiling point of the carrier liquid under the conditions of heating, however sufficiently high to desorb the adsorbed straight chain hydrocarbons contained in the adsorbent. The resulting heated slurry is removed from heater 42 via conduit 44 and introduced into vapor-slurry separator 45 from which the vaporized desorbed straight chain hydrocarbons are recovered as a separate product via line 46. The remaining slurry now containing essentially only inert carrier liquid and desorbed, regenerated selective adsorbent is recycled via line 34 to contact additional liquid hydrocarbon feed mixture for the recovery of additional straight chain hydrocarbons.

In accordance with another embodiment of this invention wherein a liquid carrier which is immiscible with the liquid hydrocarbon feed mixture undergoing treatment is employed, the carrier liquid also advantageously being a preferential solvent for the component to be selectively adsorbed, e.g. in the instance where aromatic hydrocarbons are to be selectively adsorbed, employing a selective solvent for aromatic hydrocarbons as the carrier liquid, there is provided means such as settler 37 for effecting separation of the slurry admixture from mixer 32 containing liquid hydrocarbon mixture undergoing treatment, immiscible carrier liquid and the solid, particle-form selective adsorbent. In this embodiment of the invention the slurry admixture from mixer 32 is introduced via line 33 into settler 37 wherein stratification between the resulting treated hydrocarbon mixture and carrier liquid containing the adsorbent is permitted to take place. The liquid treated hydrocarbon phase is withdrawn from settler 37 via line 47 and finally recovered as product via line 40. The carrier liquid phase together with the solid adsorbent admixed therein is withdrawn from settler 37 via line 43 for subsequent treatment in the manner already described hereinabove.

It is an added feature of this invention to aid in the desorption and separation of the adsorbed material from the slurry of carrier liquid and adsorbent in vapor-slurry separator 45 by introducing thereinto via line 48 a gaseous stripping and sweeping medium such as methane, flue gas, carbon dioxide, superheated steam at desorption conditions of temperature, preferably under conditions that substantially no adsorption or condensation of the stripping medium by the carrier liquid or adsorption of the stripping medium by the adsorbent takes place. Superheated steam is useful as the gaseous stripping medium since it can readily be separated from the resulting desorbed product by condensation. Also carbon dioxide is particularly suitable as the gaseous stripping medium since it can readily be separated from the resulting desorbed product by caustic washing or water washing under pressure and by other well known methods, recovered and recycled.

The following is exemplary of the practice of this invention. Slurries of Linde Type 5A Molecular Sieve, in powder and granular form, were prepared by mixing therewith liquid benzene. Normal butane was then introduced into the slurries. It was observed that the solid selective adsorbent present in the slurry adsorbed the normal butane introduced into contact therewith. Furthermore, it was determined that a slurry containing 25 cc. benzene and 7 grams of Linde Type 5A Molecular Sieve powder adsorbed and otherwise took up 1,867 ccs. of gaseous n-butane. It was further observed that a slurry comprising 25 cc. benzene and 14.0 grams Linde Type 5A Molecular Sieve adsorbed and otherwise consumed 1,985 cc. of gaseous n-butane. It was observed that the alumino-silicate selective adsorbent adsorbed upwards of 13% by weight straight chain hydrocarbons such as n-butane.

Further illustrative of the practice of this invention, a catalytic reformate containing straight chain hydrocarbons and non-straight chain hydrocarbons is contacted at a temperature in the range 100–250° F. with a slurry containing a solid selective adsorbent for straight chain hydrocarbons (Linde No. 5A Molecular Sieve) and a high boiling petroleum fraction, such as a gas oil substantially free of straight chain hydrocarbons. The resulting admixture was then heated to a temperature sufficiently high, e.g., in the range 400–500° F., to vaporize the unadsorbed non-straight chain hydrocarbons contained in the thus-treated reformate without any substantial vaporization and/or desorption of the adsorbed straight chain hydrocarbons. The resulting remaining admixture was then heated to a higher temperature, e.g. in the range 550–700° F., to effect desorption of the previously adsorbed straight chain hydrocarbons from the adsorbent without at the same time effecting vaporization of more than a major amount of the high boiling gas oil carrier liquid. The desorbed straight chain hydrocarbons are then separately recovered and the remaining heated slurry comprising the solid adsorbent and the relatively high boiling gas oil carrier liquid is then recycled to contact additional catalytic reformate to be treated.

For purposes of simplicity and ease of understanding the conventional associated equipment such as recycle lines, by-pass lines, valves, pumps, heat exchangers, flow regulators and the like have for the most part not been schematically illustrated in the drawings. The proper location and employment of these items in the practice of this invention is considered well known to and within the skill of those skilled in the art to which this invention appertains.

As will be apparent to those skilled in the art many modifications, changes and alterations may be made in the practice of this invention without departing from the spirit or scope thereof.

We claim:

1. A method of fractionating a liquid hydrocarbon mixture containing straight chain hydrocarbons and non-straight chain hydrocarbons which comprises contacting said liquid mixture with a solid alumino-silicate molecular sieve selective adsorbent which selectively adsorbs straight chain hydrocarbons to the substantial exclusion of non-straight chain hydrocarbons, said adsorbent being admixed as a slurry with a carrier liquid, said carrier liquid being substantially unadsorbed by said adsorbent and having a boiling point substantially greater than said liquid mixture undergoing fractionation, and separating from the resulting admixture said adsorbent containing straight chain hydrocarbons adsorbed therein admixed with said carrier liquid.

2. A method in accordance with claim 1 wherein said carrier liquid is also a selective solvent for straight chain hydrocarbons in said liquid hydrocarbon mixture.

3. A method of fractionating a liquid hydrocarbon mixture containing straight chain hydrocarbons and non-straight chain hydrocarbons which comprises contacting said liquid mixture with a slurry comprising a high boiling, inert carrier liquid, said carrier liquid being substantially unadsorbed by said adsorbent and having a boiling point substantially greater than the boiling point of said liquid mixture undergoing fractionation, and a solid, particle-form calcium alumino-silicate molecular sieve adsorbent, said calcium alumino-silicate adsorbent preferentially adsorbing the straight chain hydrocarbons contained in said mixture to the substantial exclusion of the non-straight chain hydrocarbons, heating the resulting admixture of slurry and hydrocarbon mixture to effect vaporization of the unadsorbed hydrocarbons present in said liquid hydrocarbon mixture, recovering said unadsorbed hydrocarbons, and subjecting the resulting remaining admixture containing as a slurry said high boiling inert carrier liquid and said particle-form calcium alumino-silicate adsorbent containing straight chain hydrocarbons adsorbed therein to a relatively elevated temperature sufficient to effect desorption of the adsorbed straight chain hydrocarbons.

4. A method of fractionating a liquid hydrocarbon mixture containing straight chain hydrocarbons and non-straight chain hydrocarbons which comprises contacting said liquid mixture with a slurry comprising a high boiling, inert carrier liquid, said carrier liquid being substantially unadsorbed by said adsorbent and having a boiling point substantially greater than said liquid mixture undergoing fractionation and being immiscible with said liquid mixture, and a solid, alumino-silicate molecular sieve particle-form selective adsorbent which selectively adsorbs straight chain hydrocarbons to the substantial exclusion of non-straight chain hydrocarbons, to adsorb straight chain hydrocarbons from said liquid mixture, permitting the resulting admixture to separate into two liquid phases, a treated liquid hydrocarbon phase containing the unadsorbed non-straight chain hydrocarbons and a carrier liquid phase containing said adsorbent together with straight chain hydrocarbons adsorbed therein, separating said treated liquid phase, subjecting said carrier liquid phase to a relatively elevated temperature sufficient to effect desorption of the adsorbed straight chain hydrocarbons from said adsorbent and recovering the resulting desorbed straight chain hydrocarbons.

5. A method in accordance with claim 4 wherein the carrier liquid is a selective solvent for straight chain hydrocarbons and wherein the resulting heated carrier liquid phase containing said adsorbent desorbed of said straight chain hydrocarbons is recycled to contact additional said liquid hydrocarbon mixture.

6. A method of fractionating a liquid mixture which comprises contacting said mixture in the liquid phase with a solid selective adsorbent which selectively adsorbs a component of said mixture, said adsorbent being admixed as a slurry with a carrier liquid in contact with said mixture, said carrier liquid being substantially unadsorbed by said adsorbent as well as having a boiling point substantially greater than the boiling point of said liquid mixture undergoing fractionation and being a selective solvent for said component to be adsorbed and separating from the resulting admixture said adsorbent containing said component adsorbed therein admixed with said carrier liquid.

References Cited in the file of this patent

UNITED STATES PATENTS

| | | |
|---|---|---|
| 2,287,119 | Mueller | June 23, 1942 |
| 2,306,610 | Barrer | Dec. 29, 1942 |
| 2,326,295 | Gee | Aug. 10, 1943 |
| 2,407,820 | Durrum | Sept. 17, 1946 |
| 2,420,761 | Thomas | May 20, 1947 |
| 2,522,426 | Black | Sept. 12, 1950 |
| 2,564,717 | Olsen | Aug. 21, 1951 |
| 2,614,133 | Ockert | Oct. 14, 1952 |
| 2,768,942 | Marple et al. | Oct. 30, 1956 |